United States Patent
Lai

(10) Patent No.: US 7,969,722 B2
(45) Date of Patent: Jun. 28, 2011

(54) FLIP TYPE PORTABLE ELECTRONIC DEVICE

(75) Inventor: Wei-Jen Lai, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 250 days.

(21) Appl. No.: 12/352,653

(22) Filed: Jan. 13, 2009

(65) Prior Publication Data

US 2010/0128426 A1   May 27, 2010

(30) Foreign Application Priority Data

Nov. 21, 2008  (CN) .......................... 2008 1 0305693

(51) Int. Cl.
*H05K 5/00* (2006.01)
*H05K 7/00* (2006.01)
*H04M 1/00* (2006.01)

(52) U.S. Cl. .............. 361/679.27; 455/575.1; 455/575.3
(58) Field of Classification Search ............. 361/679.27; 455/575.1, 575.3
See application file for complete search history.

(56) References Cited

U.S. PATENT DOCUMENTS

2004/0127269 A1*  7/2004  Nonaka ..................... 455/575.3
* cited by examiner

*Primary Examiner* — Jayprakash N Gandhi
*Assistant Examiner* — Anthony M Haughton
(74) *Attorney, Agent, or Firm* — D. Austin Bonderer

(57) ABSTRACT

The invention discloses a flip type portable electronic device which includes a main body and a cover. The main body includes a hinged end. The cover includes an assembling end that hinged with the hinged end of the main body. The assembling end of the cover defines a notch allowing for deformation of the assembling end. The flip type potable electronic device has simple structure and is easy to be assembled and detached that enhances the assembling efficiency and lowers the maintenance cost.

8 Claims, 2 Drawing Sheets

FLIP TYPE PORTABLE ELECTRONIC DEVICE

BACKGROUND

1. Technical Field

The present invention generally relates to portable electronic devices, and particularly to a flip type portable electronic device.

2. Discussion of the Related Art

With the developments of wireless communication and information processing technologies, portable electronic devices such as mobile phones and personal digital assistants (PDAs) are now in widespread use, and consumers may now enjoy the full convenience of high products almost anytime and anywhere.

A majority of the typical portable electronic devices are flip type portable electronic devices. The flip type portable electronic device generally includes a main body, a cover and a hinge rotatably connecting with the main body and the cover. A special tool is generally required to assemble the hinge to the portable electronic device such that, it may be difficult to detach the hinge from the main body and the cover after being assembled. In addition, the main body and cover may be easily damaged when detaching the hinge from the portable electronic device thus, thereby increasing cost and reducing assembling efficiency.

Therefore, there is room for improvement within the art.

BRIEF DESCRIPTION OF THE DRAWING

Many aspects of the present flip type portable electronic device can be better understood with reference to the following drawings. The components in the drawings are not necessarily drawn to scale, the emphasis instead being placed upon clearly illustrating the principles of the flip type portable electronic device. Moreover, in the drawings, like reference numerals designate corresponding parts throughout the several views.

DETAILED DESCRIPTION OF THE EMBODIMENT

Figure 1:
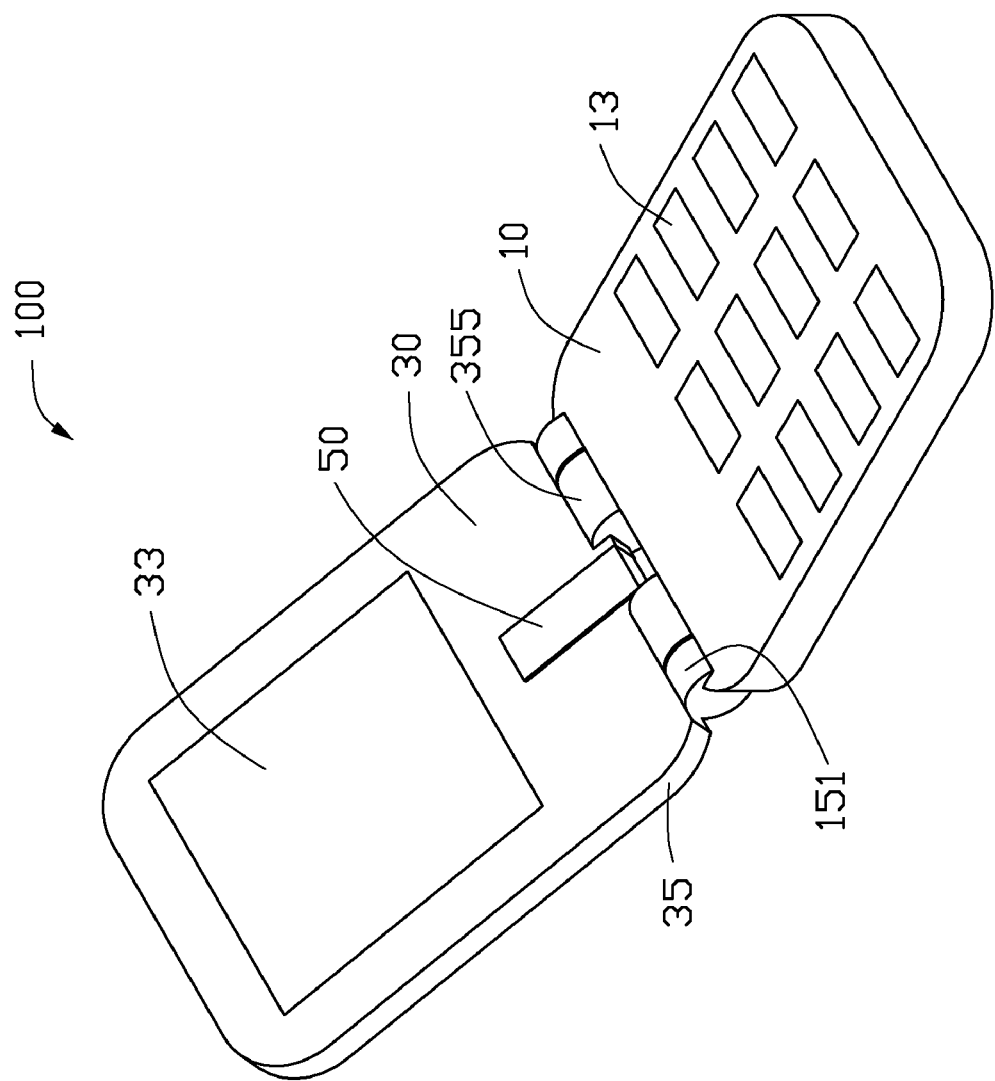
FIG. 1 shows an assembled schematic, perspective view of a flip type portable electronic device, according to the exemplary embodiment.
Figure 2:
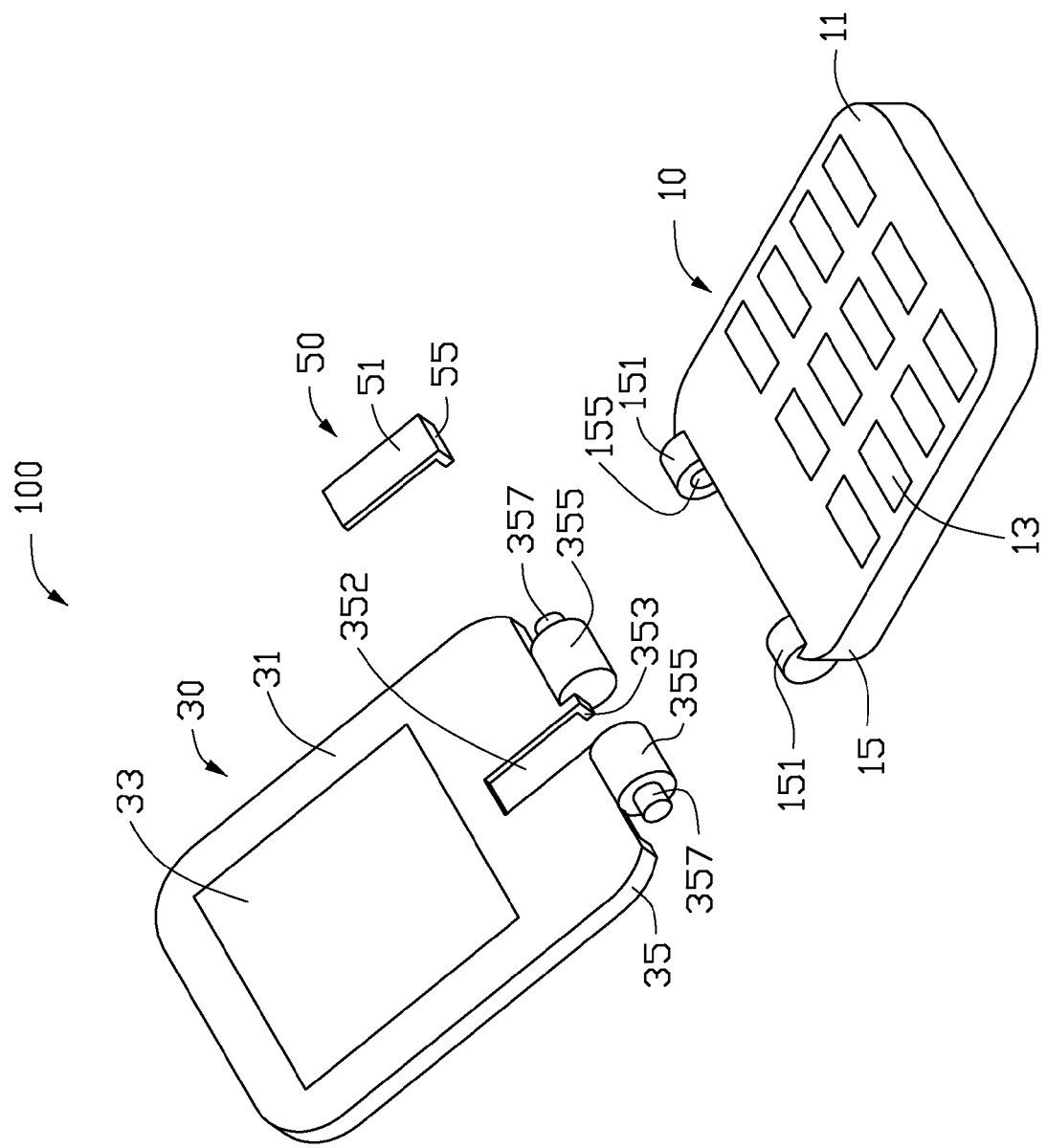
FIG. 2 shows a disassembled schematic, perspective view of a flip type portable electronic device, according to the exemplary embodiment.

Referring to FIG. 1 and FIG. 2, show a disassembled and an assembled schematic, perspective view of a flip type portable electronic device 100, according to the exemplary embodiment. The flip type electronic device 100 includes a main body 10, a cover 30 and a disassembly cover 50. The main body 10 is substantially rectangular in shape and includes an operating surface 11 and a hinged end 15. The operating surface 11 includes a plurality of functional keys 13 disposed thereon. The hinged end 15 includes two substantially cylindrical shape hinged portions 151 spaced apart from each other. Each of the hinged portions 151 has an assembling axial hole 155 defined at the center. The assembling axial holes 155 face each other.

The cover 30 is rotatably hinged with hinged end 15 of the main body 10. The cover 30 is substantially rectangular in shape and includes an inner surface 31 and an assembling end 35. The inner surface 31 includes a display screen 33 disposed thereon to show information. The assembling end 35 defines a notch 352 at a central portion extending towards the display screen 33, and a latching resist portion 353 opposite to the display screen 33. The assembling end 35 further includes two substantially cylindrical shaped assembling portions 355 spaced apart from each other at two opposite sides of the notch 352. The end surfaces of each assembling portions 355 facing away from the notch 352 protrudes a hinged axle 357 therefrom, corresponding to the assembling axial holes 155 of the two hinged portion 151. The outer diameter of the hinged axle 357 is substantially the same as the inner diameter of the assembling axial hole 155.

The disassembly cover 50 is detachably assembled and accommodated within the notch 352 of the cover 30. The disassembly cover 50 is substantially L shaped and includes an insert plate 51 and a latching block 55 extending perpendicularly from an end to the insert plate 51. The insert plate 51 is substantially rectangular shaped configured to insert into the notch 352 of the cover 30 and be tightly accommodated within the notch 352. The latching block 55 is configured for latching with the latching resist portion 353 of the cover 30.

In assembly, two opposite ends of the assembling end 35 are pressed toward to deform to make the hinged axles 357 align with the axial holes 155. The hinged axles 357 are then inserted into the axial holes 155 to rotatably connect the cover 30 with the main body 10. The disassembly cover 50 is attached and accommodated within the notch 352. The insert plate 51 is inserted into the notch 352 and tightly accommodated within the notch 352. The latching block 55 of the disassembly cover 50 latches with the latching resist portion 353 of the cover 30.

When the flip type portable electronic device 100 needs repair or maintenance, the disassembly cover 50 is firstly removed from the cover 30, then, the two opposite ends of the assembling end 35 are again pressed toward each other to deformed to facilitate disengaging of the hinged axles 357 from the axial holes 155. The cover 30 is detached from the main body 10.

With this structure, the flip type portable electronic device 100 can easily be detached for repair. The structure of the present flip type portable electronic device 100 is simple, thereby reducing cost and enhancing assembling efficiency.

Finally, it is to be understood, however, that even though numerous characteristics and advantages of the present invention have been set forth in the foregoing description, together with details of the structure and function of the present invention, the disclosure is illustrative only, and changes may be made in detail, especially in matters of shape, size, and arrangement of parts within the principles of present invention to the full extent indicated by the broad general meaning of the terms in which the appended claims are expressed.

What is claimed is:

1. A flip type portable electronic device, comprising:
   a main body having a hinged end formed at one end thereof;
   a cover having a deformable assembling end formed at one end thereof, the assembling end being pivotably connected with the hinged end of the main body, the assembling end of the cover having a notch; and
   a disassembly cover being accommodated within the notch of the cover and capable of resisting deformation of the assembling end;
   wherein when the disassembly cover is detached from the notch, two opposite sides of the assembling end can be pressed towards each other, reducing the volume of the notch, releasing the pivotal connection of the assembling end and the hinged end.

2. The flip type portable electronic device as claimed in claim 1, wherein the hinged end includes two hinged portions spaced apart, the two hinged portions each defines an assembling axial hole; the assembling end includes two assembling portions spaced apart from each other at two opposite sides of the notch the assembling portions positioned between and pivotally connected with the hinged portions, respectively.

3. The flip type portable electronic device as claimed in claim 2, wherein the assembling portions comprise of end surfaces facing away from the notch each from which protrudes a hinged axle, the hinged axels correspond to the assembling axial holes of the two hinged portions; the outer diameter of the hinged axle is the approximately same as the inner diameter of the assembling axial hole.

4. The flip type portable electronic device as claimed in claim 3, wherein the cover further includes an inner surface, the inner surface includes a display screen; the notch is defined through the middle portion of the assembling end.

5. The flip type portable electronic device as claimed in claim 4, wherein the assembling end comprises of a latching resist portion near the notch; the disassembly cover comprises an insert plate and a latching block; the insert plate is removably secured in the notch and the latching block abuts the latching resist portion.

6. A method for dissembling a flip type portable electronic device, comprising:

providing the portable electronic device with a main body having a hinged end formed at one end thereof, and a cover having a deformable assembling end formed at one end thereof, the assembling end of the cover having a notch;

pivotably connecting the assembling end to the hinged end of the main body;

pressing two opposite sides of the assembling end towards each other, reducing the volume of the notch, releasing the pivotal connecting of the assembling end and the hinged end.

7. The method for dissembling a flip type portable electronic device as claimed in claim 6, further comprising providing a disassembly cover accommodated within the notch of the cover for resisting deformation of the assembling end when the hinged end pivotably connected to the assembling end.

8. The method for dissembling a flip type portable electronic device as claimed in claim 7, wherein when the disassembly cover is detached from the notch, the two opposite sides of the assembling end is pressed to release the pivotal connection between the assembling end and the hinged end.

* * * * *